United States Patent
Yamamoto (10) Patent No.: US 11,321,026 B2
(45) Date of Patent: May 3, 2022

(54) COLOR VALUE PREDICTION SYSTEM AND GENERATION METHOD FOR COLOR VALUE PREDICTOR

(71) Applicant: SEIKO EPSON CORPORATION, Tokyo (JP)

(72) Inventor: Yuko Yamamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/207,837

(22) Filed: Mar. 22, 2021

(65) Prior Publication Data
US 2021/0303230 A1  Sep. 30, 2021

(30) Foreign Application Priority Data
Mar. 24, 2020  (JP) .............................. JP2020-052364

(51) Int. Cl.
| | | |
|---|---|---|
| *G06F 15/00* | (2006.01) | |
| *G06K 1/00* | (2006.01) | |
| *H04N 1/00* | (2006.01) | |
| *G06F 3/12* | (2006.01) | |
| *G06N 20/00* | (2019.01) | |

(52) U.S. Cl.
CPC .......... *G06F 3/1208* (2013.01); *G06F 3/1229* (2013.01); *G06N 20/00* (2019.01)

(58) Field of Classification Search
CPC ...... G06F 3/1208; G06F 3/1229; G06N 20/00
USPC ........................ 358/1.15, 1.13, 1.14, 1.1, 1.6
See application file for complete search history.

(56) References Cited

U.S. PATENT DOCUMENTS

| | | | |
|---|---|---|---|
| 2011/0069334 A1* | 3/2011 | Hoshii ................. | H04N 1/6033 358/1.9 |
| 2021/0192339 A1* | 6/2021 | Ho ........................ | G06N 3/0454 |
| 2021/0201535 A1* | 7/2021 | Steenhoek ................. | G06T 7/90 |

FOREIGN PATENT DOCUMENTS

JP     2012-249182 A     12/2012

* cited by examiner

*Primary Examiner* — Douglas Q Tran
(74) *Attorney, Agent, or Firm* — Global IP Counselors, LLP (57) ABSTRACT

A color value prediction system includes a color-value predicting section configured to receive an input of information representing ink amounts of a first apparatus and output spectral reflectance, a receiving section configured to receive an input of information representing a designated color gamut, a preparing section configured to prepare first teacher information representing a plurality of sets of combinations of ink amounts of the first apparatus and second teacher information, which is a plurality of sets of spectral reflectance respectively associated with the plurality of sets of combinations of ink amounts of the first teacher information, and a generating section configured to generate the color-value predicting section with machine learning in which the first teacher information serving as an input value and the second teacher information serving as an output value are used as teacher data. The first teacher information includes designated teacher information representing a combination of ink amounts of the first apparatus representing a color included in the designated color gamut.

12 Claims, 5 Drawing Sheets

COLOR VALUE PREDICTION SYSTEM AND GENERATION METHOD FOR COLOR VALUE PREDICTOR

The present application is based on, and claims priority from JP Application Serial Number 2020-052364, filed Mar. 24, 2020, the disclosure of which is hereby incorporated by reference herein in its entirety.

BACKGROUND

1. Technical Field

The present disclosure relates to a color value prediction system and a generation method for a color value predictor.

2. Related Art

There has been a color value prediction model storing color measurement values not depending on apparatuses and gradation values of CMYK in association with each other. A technique described in JP-A-2012-249182 (Patent Literature 1) is a technique for, when generating a color value prediction model, increasing, about a region where brightness is low in a color space, the number of color patches to be subjected to colorimetry, causing a neural network to learn the number of color patches, and generating a color value prediction model. By performing such processing, it is possible to improve prediction accuracy of the color value prediction model about the region where brightness is low in the color space.

However, in the technique described in Patent Literature 1, prediction accuracy of a region of any color that a user considers important in the color space cannot be improved.

SUMMARY (1) According to an aspect of the present disclosure, there is provided a color value prediction system that receives an input of information representing a combination of ink amounts and outputs spectral reflectance. The color value prediction system includes: a color-value predicting section configured to receive an input of information representing ink amounts of a first apparatus and output spectral reflectance; a receiving section configured to receive an input of information representing a designated color gamut; a preparing section configured to prepare first teacher information representing a plurality of sets of combinations of ink amounts of the first apparatus and second teacher information, which is a plurality of sets of spectral reflectance respectively associated with the plurality of sets of combinations of ink amounts of the first teacher information; and a generating section configured to generate the color-value predicting section with machine learning in which the first teacher information serving as an input value and the second teacher information serving as an output value are used as teacher data. The first teacher information includes designated teacher information representing a combination of ink amounts of the first apparatus representing a color included in the designated color gamut.

(2) According to another aspect of the present disclosure, there is provided a generation method for a color value predictor storing information representing a combination of ink amounts and spectral reflectance in association with each other. The generation method for the color value predictor includes: receiving an input of information representing a designated color gamut; preparing first teacher information representing a plurality of sets of combinations of ink amounts of a first apparatus and second teacher information, which is a plurality of sets of spectral reflectance respectively associated with the plurality of sets of combinations of ink amounts of the first teacher information; and generating the color value predictor with machine learning in which the first teacher information serving as an input value and the second teacher information serving as an output value are used as teacher data. The first teacher information includes designated teacher information representing a combination of ink amounts of the first apparatus representing a color included in the designated color gamut.

DESCRIPTION OF EXEMPLARY EMBODIMENTS

A. First Embodiment

A1. Configuration of a Color Value Prediction System

Figure 1:
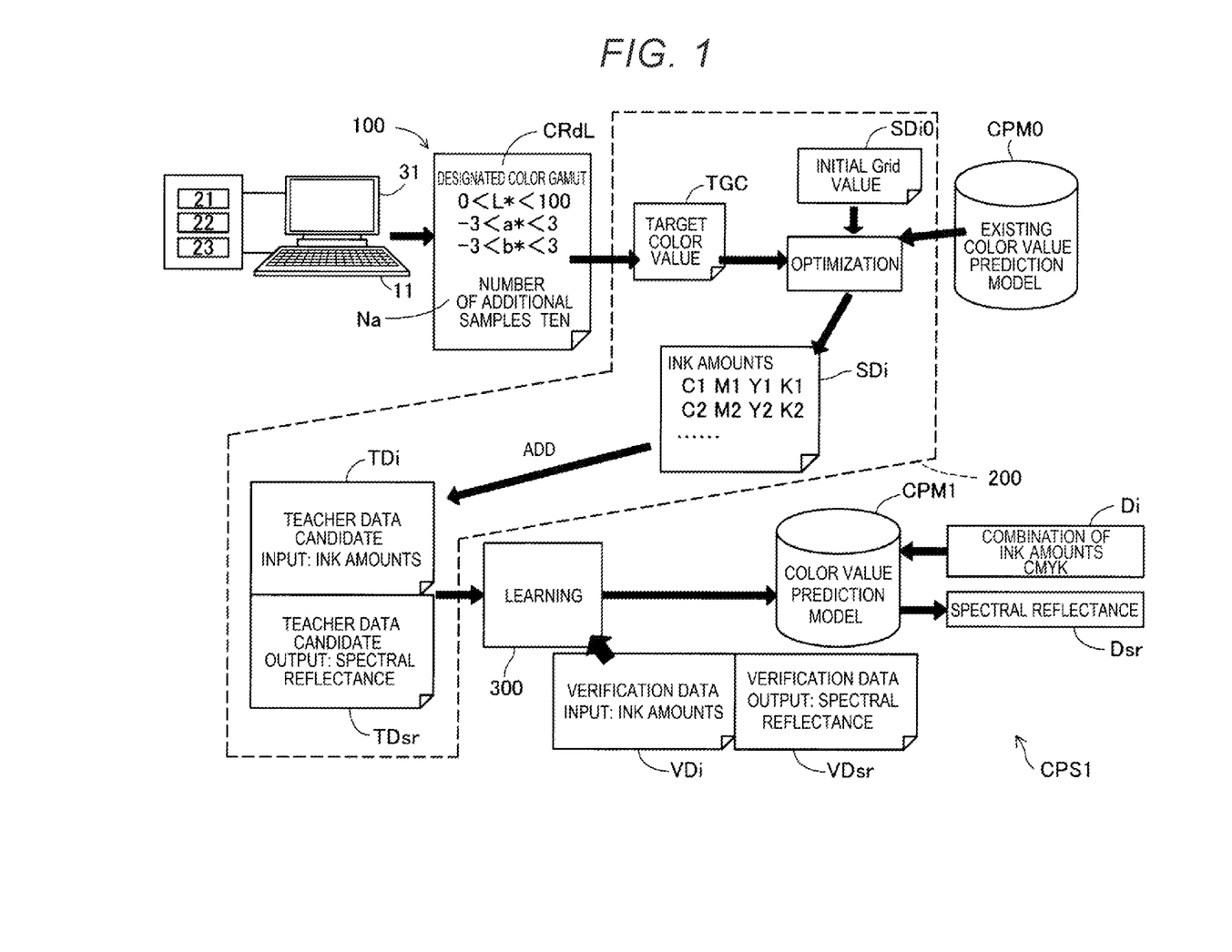
FIG. 1 is an explanatory diagram showing a color value prediction system in a first embodiment.

FIG. 1 is an explanatory diagram showing a color value prediction system CPS1 in a first embodiment. The color value prediction system CPS1 is a system that receives an input of information Di representing a combination of ink amounts and outputs spectral reflectance Dsr. More specifically, a color value prediction model CPM1 of the color value prediction system CPS1 receives an input of the information Di representing the combination of ink amounts of a first apparatus and outputs the spectral reflectance Dsr (see a lower right part of FIG. 1).

The color value prediction system CPS1 is specifically realized by a computer. The color value prediction system CPS1 includes a keyboard 11 and a mouse functioning as an input device, a CPU 21 functioning as a processor, a RAM 22, a ROM 23, and a display 31 functioning as an output device. The display 31 functioning as the output device assists, with display on the display 31, an input by a user via the input device.

The color value prediction system CPS1 includes, as functional sections, a color value prediction model CPM0, the color value prediction model CPM1, a receiving section 100, a preparing section 200, and a generating section 300. The CPU 21 functioning as the processor develops a computer program stored in the ROM 23 to the RAM 22 and executes the computer program, whereby the receiving section 100, the preparing section 200, and the generating section 300 are realized. The receiving section 100, the preparing section 200, and the generating section 300 receives an input of information via the input device and performs an output via the output device in a part of processing performed by the receiving section 100, the preparing section 200, and the generating section 300. The color value prediction model CPM0 and the color value prediction model CPM1 are stored in the RAM 22.

The color value prediction model CPM1 can receive an input of the information Di representing the combination of ink amounts of the first apparatus and output information representing a combination of gradation values in an L*a*b* color space and the spectral reflectance Dsr (see the lower right part of FIG. 1). The color value prediction model CPM1 is a database storing, in association with one another, (a) the information Di representing a combination of ink amounts of the first apparatus, (b1) information representing a combination of gradation values in the L*a*b* color space of a color reproduced in the combination of ink amounts in the information Di by the first apparatus, and (b2) the spectral reflectance Dsr of the color reproduced in the combination of ink amounts in the information Di by the first apparatus. The first apparatus, to which the color value prediction model CPM1 is applied, is a specific printer. The first apparatus is specified by a combination of a model of an apparatus, setting such as a printing mode in the apparatus, and printing media used in the apparatus.

The color value prediction model CPM0 can receive an input of the information Di representing a combination of ink amounts of a certain apparatus and output information representing a combination of gradation values in the L*a*b* color space and the spectral reflectance Dsr (see an upper right part of FIG. 1). The color value prediction model CPM0 is a database storing, in association with one another, (a) the information Di representing a combination of ink amounts of a certain apparatus, (b1) information representing a combination of gradation values in the L*a*b* color space of a color reproduced in the combination of ink amounts in the information Di by the apparatus, and (b2) the spectral reflectance Dsr of the color reproduced in the combination of ink amounts in the information Di by the apparatus. The apparatus, to which the color value prediction model CPM0 is applied, is a specific printer. The apparatus is specified by a combination of a model of an apparatus, setting such as a printing mode in the apparatus, and printing media used in the apparatus.

The apparatus, to which the color value prediction model CPM0 is applied, is an apparatus of the same model as the first apparatus, that is, a printer of the same model as the first apparatus. At least one of the setting in the apparatus and the media used in the apparatus is different from the setting in the first apparatus and the media used in the first apparatus. However, the setting in the apparatus is setting that is the same as or similar to the setting in the first apparatus. The media used in the apparatus are media that are the same as or similar to the media used in the first apparatus. That is, the apparatus, to which the color value prediction model CPM0 is applied, is an apparatus having characteristics that are similar to characteristics of the first apparatus concerning performance for reproducing a color.

The receiving section 100 receives an input of information CRdL representing a designated color gamut and an input of a number Na (Na is an integer equal to or larger than one) of additional samples from the user via the keyboard 11 and the mouse functioning as the input device (see an upper left part of FIG. 1). In the example shown in FIG. 1, ten is indicated as an input for designating the number Na of additional samples. The number Na of additional samples is the number of target color values TGC. The number Na of additional samples is explained below.

The designated color gamut CRdL is a color gamut where the user considers accuracy of conversion important in conversion by the color value prediction model CPM1. An input of the designated color gamut CRdL to the receiving section 100 from the user is performed according to gradation values in the L*a*b* color space. A designated color gamut specified by the gradation values in the L*a*b* is represented as the designated color gamut CRdL in this specification.

By performing such processing, the user can accurately designate, using the gradation values in the L*a*b* color space not depending on apparatuses, the designated color gamut CRdL including a color that the user considers important. In the example shown in FIG. 1, as an input for designating the designated color gamut CRdL, 0<L*<100, −3<a*<3, and −3<b*<3 are shown.

The preparing section 200 prepares, based on the designated color gamut CRdL and the number Na of additional samples input to the receiving section 100, information TDi representing a plurality of sets of combinations of ink amounts of the first apparatus and a plurality of sets of the spectral reflectance TDsr (see a lower left part of FIG. 1). The plurality of sets of the spectral reflectance TDsr are respectively associated with the plurality of sets of combinations of ink amounts of the first apparatus in the information TDi. The information TDi representing the plurality of sets of combinations of ink amounts of the first apparatus and the plurality of sets of the spectral reflectance TDsr are used as teacher data in machine learning by the generating section 300. Details of processing in the preparing section 200 are explained below.

The generating section 300 generates the color value prediction model CPM1 with machine learning in which the information TDi representing the plurality of sets of combinations of ink amounts of the first apparatus serving as an input value and the plurality of sets of the spectral reflectance TDsr serving as an output value are used as the teacher data (see a lower center part of FIG. 1).

A2. Processing in the Color Value Prediction System

Figure 2:
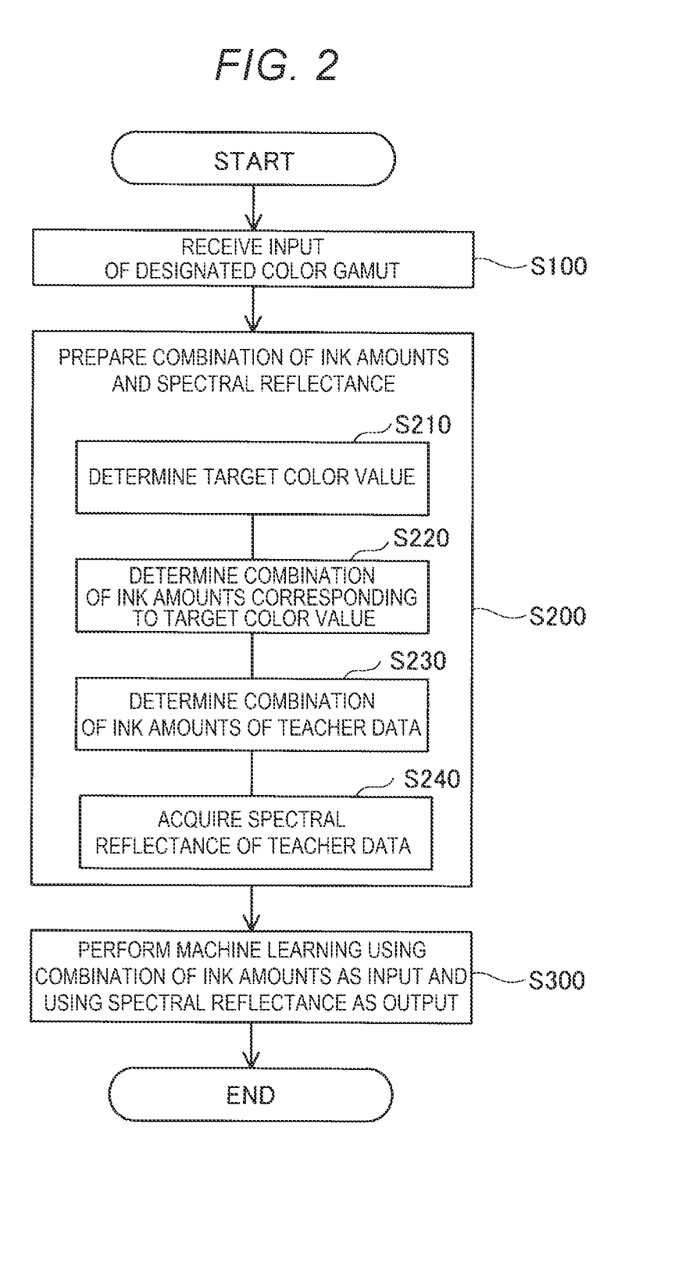
FIG. 2 is a flowchart showing processing in the color value prediction system.

FIG. 2 is a flowchart showing processing in the color value prediction system. The processing shown in FIG. 2 can be grasped as a generation method or an adjustment method for the color value prediction system CPS1. The CPU 21 functioning as the processor develops a computer program stored in the ROM 23 to the RAM 22 and executes the computer program, whereby the processing shown in FIG. 2 is executed.

In step S100, the receiving section 100 receives, from the user, an input of the information representing the designated color gamut CRdL and an input of the number Na of additional samples (see the upper left part of FIG. 1).

In step S200, the preparing section 200 prepares, based on the designated color gamut CRdL input to the receiving section 100 and the number Na of additional samples, the information TDi representing the plurality of sets of combinations of ink amounts of the first apparatus and the plurality of sets of spectral reflectance TDsr (see the lower left part of FIG. 1). Processing in step S200 is performed as follows.

In step S210, the preparing section 200 determines Na target color values TGC out of the designated color gamut CRdL. For example, the target color values TGC can be selected out of lattice points obtained by equally dividing the designated color gamut CRdL in directions of L*, a*, and b*. When ten is input as the input for designating the number Na of additional samples in step S100, ten sets of target color values TGC are determined out of the designated color gamut CRdL (see an upper center part of FIG. 1). The target color values TGC are combinations of gradation values in the L*a*b* color space.

In step S220, the preparing section 200 determines information SDi of a combination of ink amounts of the first apparatus corresponding to the target color values TGC. The information SDi of the combination of ink amounts is represented by ink amounts about colors of cyan, magenta, yellow, and black that are ink colors of the first apparatus, to which the color value prediction model CPM1 is applied, for example, [C, M, Y, K]=[C1, M1, Y1, K1], [C2, M2, Y2, K2] (see a center part of FIG. 1).

In the following explanation, in order to facilitate understanding of a technique, it is assumed that the ink colors of the first apparatus are four colors of cyan, magenta, yellow, and black. However, the ink colors of the first apparatus can include one or more ink colors such as light cyan, light magenta, red, green, and orange in addition to cyan, magenta, yellow, and black.

First, initial Grid values SDiO specified by ink amounts of cyan (C), magenta (M), yellow (Y), and black (K) of the first apparatus are designated (see the upper right part of FIG. 1). For example, when the designated color gamut CRdL is L*=0, 0<a*, and 0<b*, the following eight points are designated as the initial Grid values SDiO. The ink amounts are designated by 0 to 100%.

[C, M, Y, K]=[0, 50, 0, 0], [0, 0, 50, 0], [0, 50, 0, 50], [0, 0, 50, 50], [0, 50, 50, 0], [50, 50, 50, 0], [50, 50, 50, 50]. Since the designated color gamut CRdL is 0<a* and 0<b*, for example, [C, M, Y, K]=[50, 0, 0, 0] representing a single color of cyan and [C, M, Y, K]=[50, 0, 50, 0] reproduced by only cyan and yellow are not included in the initial Grid values SDiO.

The preparing section 200 acquires, about the points in a CMYK color space designated by the ink amounts of CMYK, a combination of gradation values in the L*a*b* color space corresponding to the points using the color value prediction model CPM0 (see the upper right part of FIG. 1).

The preparing section 200 selects, about each of the Na target color values TGC, the initial Grid value SDi0 having the smallest color difference out of the initial Grid values SDiO. About the plurality of target color values TGC, the same initial Grid value SDi0 can be selected. The color difference is obtained, from a combination of gradation values in the L*a*b* color space of the target color values TGC and a combination of gradation values in the L*a*b* color space of the initial Grid value SDi0, as a distance in the L*a*b* color space between the combinations of the gradation values.

The preparing section 200 adjusts, about the initial Grid values SDi0 selected for the target color values TGC, ink amounts of C, M, Y, and K such that color differences between the initial Grid values SDiO and the garget color values TGC corresponding to the initial Grid values SDiO decrease.

The preparing section 200 acquires, about Grid values SDin after the adjustment, a combination of gradation values in the L*a*b* color space using the color value prediction model CPM0. The preparing section 200 adjusts, about the Grid values SDin, the ink amounts of C, M, Y, and K such that color differences between the Grid values SDin and the target color values TGC corresponding to the Grid values SDin decrease.

The preparing section 200 repeats the above processing until a predetermined condition is satisfied. The predetermined condition can be that, for example, color differences are equal to or smaller than a threshold about all the target color values TGC or the above processing is repeated up to a predetermined upper limit number of times.

As a result, information SDin representing a plurality of sets of combinations of ink amounts of the first apparatus corresponding to the Na target color values TGC is adjusted based on the combination of the gradation values in the L*a*b* color space acquired using the color value prediction model CPM0.

In this embodiment, input gradation values in the L*a*b* color space can be easily converted into information about a combination of ink amounts by using the color value prediction model CPM0. Accordingly, it is possible to easily prepare the information SDi representing a combination of ink amounts representing a color in the designated color gamut CRdL serving as an input value for learning (see the middle of FIG. 1).

In the information SDin representing the plurality of sets of combinations of ink amounts, about a plurality of combinations of ink amounts approximate to one another by a certain degree or more, the preparing section 200 selects only one combination of ink amounts out of the plurality of combinations of ink amounts. By performing such processing, it is possible to reduce possibility that deviation occurs in accuracy of the color value prediction model CPM1 in the designated color gamut CRdL. The preparing section 200 can select a combination of ink amounts, a total amount of which is the smallest, for example, out of the plurality of combinations of ink amounts approximate to one another.

According to the above processing, the Na target color values TGC and a combination SDi of ink amounts corresponding to the Na target color values TGC are determined (see S210 and S220 in FIG. 2). The above processing in step S220 is referred to as "optimization" in this specification (see the upper right part of FIG. 1). Examples of the combination SDi of ink amounts are shown as [C1, M1, Y1, K1], [C2, M2, Y2, K2], . . . in the middle of FIG. 1.

The obtained combination SDi of ink amounts is information representing a combination of ink amounts of an apparatus, to which the color value prediction model CPM0 is applied, for reproducing a color included in the designated color gamut CRdL.

However, the apparatus, to which the color value prediction model CPM0 is applied, is an apparatus having characteristics similar to the characteristics of the first apparatus concerning performance for reproducing a color. Accordingly, the combination SDi of ink amounts obtained by the optimization is used in the generating section 300 as the information SDi representing a combination of ink amounts of the first apparatus for reproducing the color included in the designated color gamut CRdL.

In step S230 in FIG. 2, the preparing section 200 determines the information TDi representing the plurality of sets of combinations of ink amounts of the first apparatus. The information TDi representing the plurality of sets of combinations of ink amounts is used as teacher data of machine learning in step S300. The information TDi representing the plurality of sets of combinations of ink amounts of the first apparatus includes (i) a plurality of sets of combinations of ink amounts selected such that there is no deviation in a color space that the first apparatus can reproduce. Further, the information TDi representing the plurality of sets of combinations of ink amounts of the first apparatus includes (ii) the information SDi of the combination of ink amounts obtained by the optimization in step S220. The combination SDi of ink amounts obtained by the optimization is information representing the combination of ink amounts of the first apparatus for reproducing the color included in the designated color gamut CRdL (see the upper left part of FIG. 1).

In step S240, the preparing section 200 prepares a plurality of sets of the spectral reflectance TDsr respectively associated with the plurality of sets of combinations of ink amounts of the first apparatus represented by the information TDi. Specifically, the preparing section 200 performs printing on a printing medium using the information TDi, which represents the plurality of sets of combinations of ink amounts of the first apparatus, and the first apparatus. More specifically, in a printer of a specific model, to which the color value prediction model CPM1 is applied, specific setting, to which the color value prediction model CPM1 is applied, is performed, a specific printing medium, to which the color value prediction model CPM1 is applied, is used, and printing is performed.

The preparing section 200 performs colorimetry of an obtained printing result. The preparing section 200 obtains a plurality of sets of the spectral reflectance TDsr respectively corresponding to the plurality of sets of combinations of ink amounts of the first apparatus (see the lower left part of FIG. 1).

In step S300, the generating section 300 generates the color value prediction model CPM1 with machine learning in which the information TDi representing the plurality of sets of combinations of ink amounts of the first apparatus serving as an input value and the plurality of sets of the spectral reflectance TDsr serving as an output value are used as teacher data (see the lower left part of FIG. 1). Information VDi representing the plurality of sets of combinations of ink amounts of the first apparatus serving as an input value and the plurality of sets of spectral reflectance VDsr serving as an output value are used as verification data. The information VDi representing the plurality of sets of combinations of ink amounts of the first apparatus is information representing the plurality of sets of combinations of ink amounts of the first apparatus separately prepared as an input value of the color value prediction model CPM1. The plurality of sets of the spectral reflectance VDsr are a plurality of sets of spectral reflectance separately prepared as an output value of the color value prediction model CPM1.

The generating section 300 performs the machine learning by adding, to the information SDi of combinations of ink amounts of the first apparatus corresponding to the target color values TGC in the information TDi representing the plurality of sets of combinations of ink amounts of the first apparatus, weight larger than weight added to information representing a combination of ink amounts.

By performing such processing, in the color value prediction model CPM1, it is possible to further improve prediction accuracy of a color included in the designated color gamut CRdL, that is, a color that the user considers important.

According to this embodiment, by receiving, from the user, an input of the designated color gamut CRdL including a color that the user considers important, it is possible to improve prediction accuracy of the color that the user considers important in the color value prediction model CPM1 of the color value prediction system CPS1 (see an upper left part and the lower right part of FIG. 1).

In this embodiment, the information TDi representing the plurality of sets of combinations of ink amounts of the first apparatus prepared by the preparing section 200 is referred to as "first teacher information" as well. The plurality of sets of the spectral reflectance TDsr respectively associated with the plurality of sets of combinations of ink amounts of the first apparatus in the information TDi are referred to as "second teacher information" as well. The color value prediction model CPM1 in this embodiment is referred to as "color-value predicting section" or "color value predictor" as well. The color value prediction model CPM0 is referred to as "another color-value predicting section" or "another color value predictor" as well. The combination SDi of ink amounts of the first apparatus corresponding to the target color values TGC included in the designated color gamut CRdL is referred to as "designated teacher information" as well.

B. Second Embodiment

Figure 3:
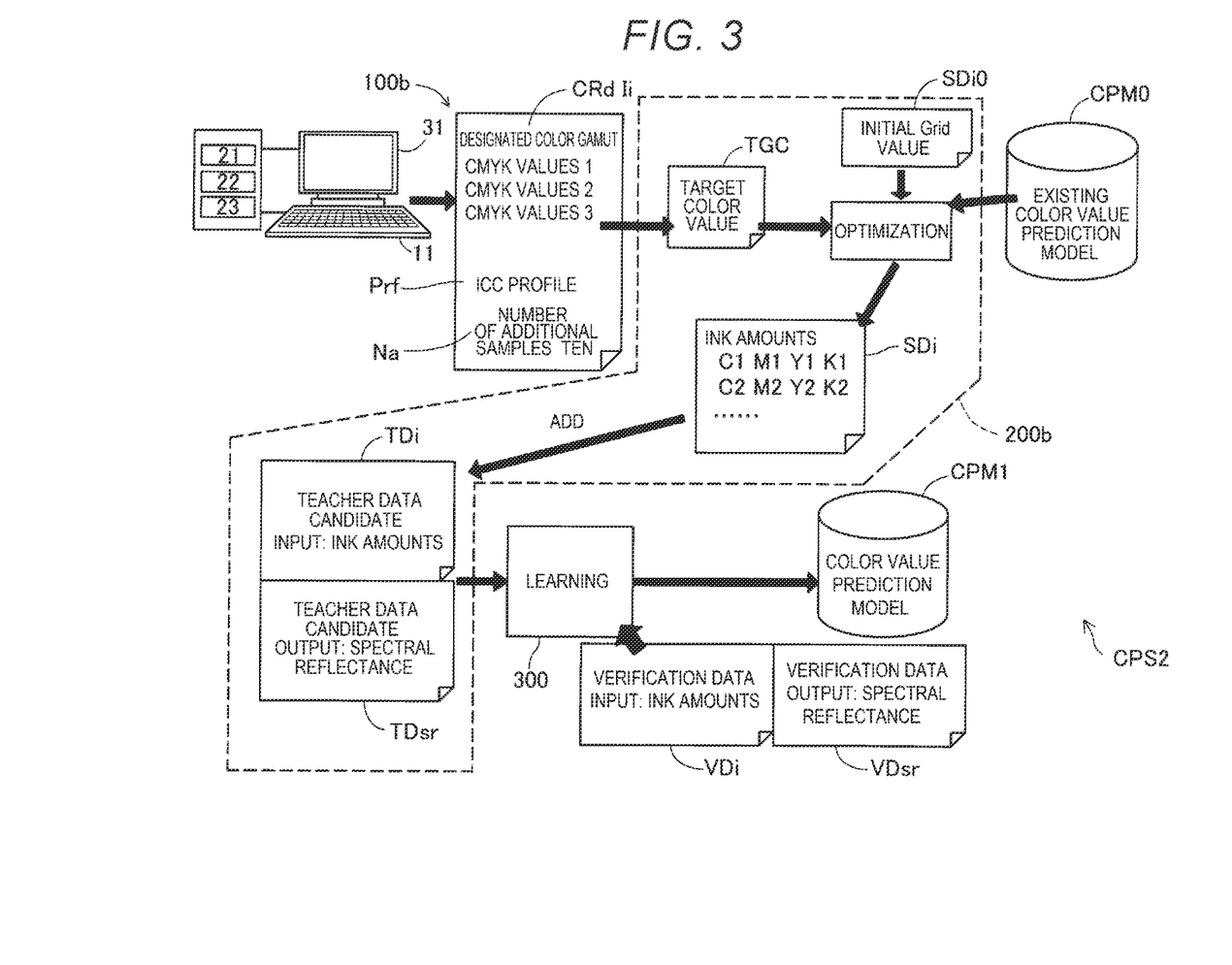
FIG. 3 is an explanatory diagram showing a color value prediction system in a second embodiment.

FIG. 3 is an explanatory diagram showing a color value prediction system CPS2 in a second embodiment. In the color value prediction system CPS2 in the second embodiment, a manner of inputting a designated color gamut to a receiving section from a user and a method of calculating gradation values of the target color values TGC are different from those in the color value prediction system CPS1 in the first embodiment (see an upper center part of FIG. 3 and the upper center part of FIG. 1). Otherwise, the color value prediction system CPS2 in the second embodiment is the same as the color value prediction system CPS1 in the first embodiment.

In the color value prediction system CPS2, a receiving section 100b receives, from the user, designation of an ICC profile Prf of a certain apparatus, an input of a designated color gamut CRdIi by a combination of gradation values in a CMYK color space of the apparatus, and an input of the number Na of additional samples (see an upper left part of FIG. 3).

The designated color gamut CRdIi is a color gamut where the user considers accuracy of conversion important in conversion by the color value prediction model CPM1 (see a lower right part of FIG. 3). The input of the designated color gamut CRdIi to the receiving section 100b from the user is performed according to gradation values in the CMYK color space of a certain apparatus. For example, a range of a gradation value of cyan, a range of a gradation value of magenta, a range of a gradation value of yellow, and a range of a gradation value of black are input as parameters specifying the designated color gamut CRdIi. A designated color gamut specified by gradation values in the CMYK color space of an apparatus used to describe input information is represented as the designated color gamut CRdIi in this specification.

The ICC profile Prf is an ICC (International Color Consortium) profile of an apparatus to which gradation values designating the designated color gamut CRdIi corresponds. The ICC profile Prf is an input profile. The ICC profile Prf stores, in association with each other, a combination of gradation values in the CMYK color space of a certain apparatus and a combination of gradation values in an L*a*b* color space. The ICC profile Prf stores, in association with each other, a combination of gradation values of CMYK of the apparatus to which the gradation values designating the designated color gamut CRdIi corresponds and the combination of the gradation values in the L*a*b* color space.

In step S210 in FIG. 2, a preparing section 200b determines Na target color values TGC' out of the designated color gamut CRdIi. For example, the target color values TGC' can be selected out of lattice points obtained by equally dividing the designated color gamut CRdIi in directions of C, M, Y, and K. When ten is input as the input for designating the number Na of additional samples in step S100, ten sets of lattice points are determined out of the designated color gamut CRdIi.

The preparing section 200b acquires a combination of gradation values in the L*a*b* color space corresponding to a combination of gradation values of CMYK representing the lattice points. As a result, a combination of gradation values in the L*a*b* color space corresponding to a combination of gradation values in the CMYK color space of a certain apparatus for reproducing a color included in the designated color gamut CRdIi is acquired. The obtained gradation values in the L*a*b* color space is the Na target color values TGC (see the upper center part of FIG. 3).

The subsequent processing is the same as the processing in the first embodiment. For example, information SDin representing a plurality of sets of combinations of ink amounts of the first apparatus corresponding to the Na target color values TGC is adjusted by optimization processing based on the combination of the gradation values in the L*a*b* color space acquired using the ICC profile Prf described above (see an upper right part of FIG. 3). As a result, a combination SDi of ink amounts of the first apparatus corresponding to the target color values TGC is determined.

With the color value prediction system CPS2 in the second embodiment, the user can designate, using gradation values in the CMYK color space, the gradation values being gradation values in the CMYK color space of an apparatus that the user can easily acquire, the designated color gamut CRdIi including a color that the user considers important.

In this embodiment, the apparatus to which the ICC profile Prf corresponds is referred to as "second apparatus" as well. The "second apparatus" is an apparatus to which the CMYK color space of the gradation values for designating the designated color gamut CRdIi corresponds.

C. Third Embodiment

Figure 4:
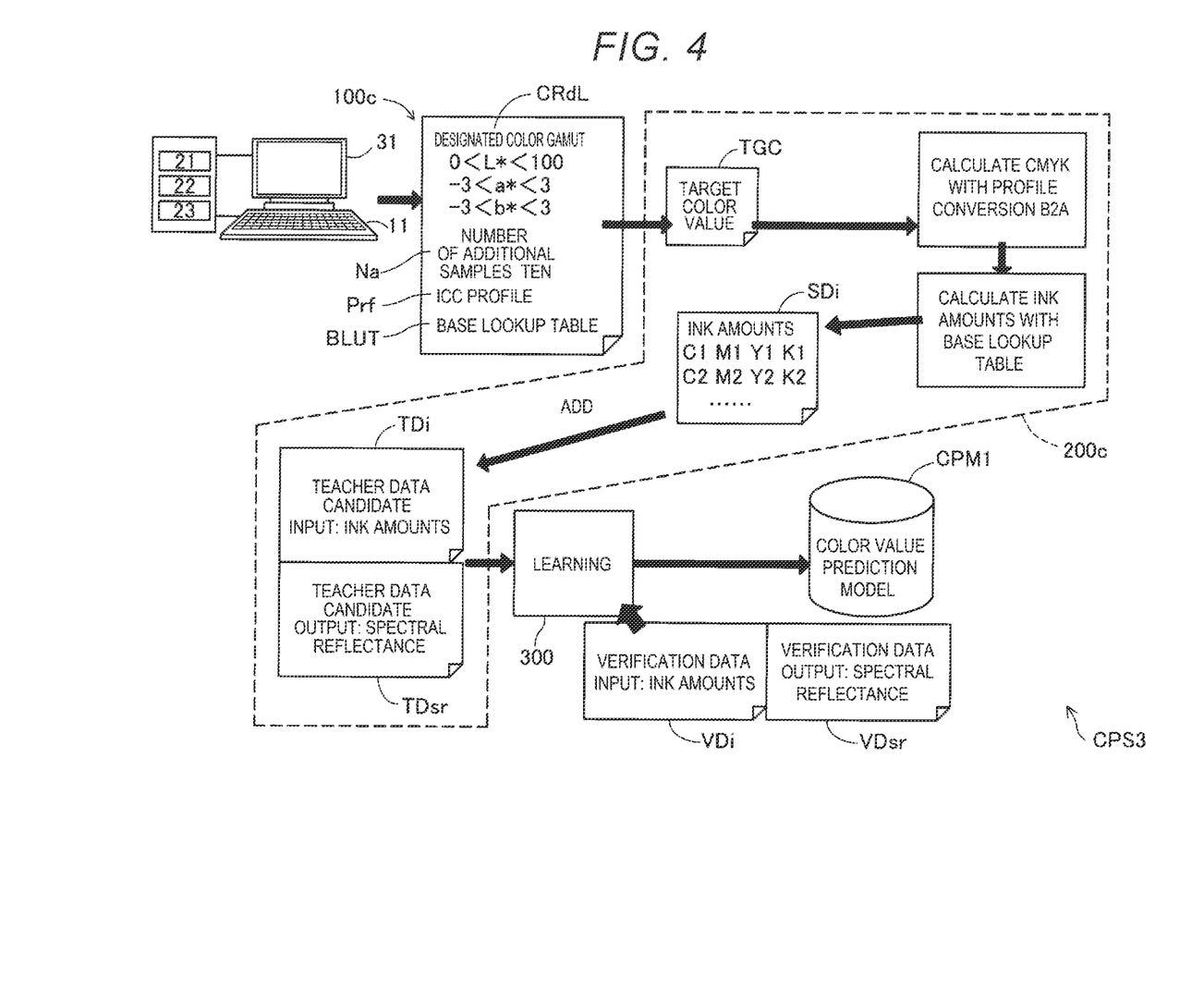
FIG. 4 is an explanatory diagram showing a color value prediction system in a third embodiment.

FIG. 4 is an explanatory diagram showing a color value prediction system CPS3 in a third embodiment. The color value prediction system CPS3 in the third embodiment does not include the color value prediction model CPM0 (see an upper right part of FIG. 4). In the color value prediction system CPS3 in the third embodiment, a manner of inputting a designated color gamut to a receiving section from a user and a method of calculating the combination SDi of ink amounts of the first apparatus corresponding to the target color values TGC are different from those in the color value prediction system CPS1 in the first embodiment (see an upper center part of FIG. 4 and the upper center part of FIG. 1). Otherwise, the color value prediction system CPS3 in the third embodiment is the same as the color value prediction system CPS1 in the first embodiment.

In the color value prediction system CPS3, a receiving section 100c receives, from the user, an input of the designated color gamut CRdL, an input of the number Na of additional samples, designation of the ICC profile Prf of a certain apparatus, and designation of abase lookup table BLUT of the apparatus (see an upper left part of FIG. 4).

The designated color gamut CRdL and the number Na of additional samples are respectively the same as the designated color gamut CRdL and the number Na of additional samples in the first embodiment. The ICC profile Prf is the same as the ICC profile Prf in the second embodiment.

The base lookup table BLUT is the base lookup table BLUT of an apparatus to which the ICC profile Prf corresponds. The base lookup table BLUT stores, in association with each other, gradation values of CMYK of the apparatus to which the ICC profile Prf corresponds and ink amounts of the apparatus to which the ICC profile Prf corresponds.

In step S220 in FIG. 2, a preparing section 200c determines the combination SDi of ink amounts of the first apparatus corresponding to the target color values TGC. The preparing section 200c converts a combination of gradation values in the L*a*b* color space of the Na target color value TGC into a combination of gradation values in the CMYK color space of a certain apparatus using the input ICC profile Prf (see the upper right part of FIG. 4).

Thereafter, the preparing section 200c converts the combination of gradation values in the CMYK color space into a combination of ink amounts of the apparatus using the input base lookup table BLUT (see a middle right part of FIG. 4). The obtained combination SDi of ink amounts is information representing a combination of ink amounts of an apparatus for reproducing a color included in the designated color gamut CRdL.

However, the apparatus to which the ICC profile Prf and the base lookup table BLOT correspond is an apparatus having characteristics similar to the characteristics of the first apparatus concerning performance for reproducing a color. Accordingly, the obtained combination SDi of ink amounts is used in the generating section 300 as the information SDi representing a combination of ink amounts of the first apparatus for reproducing a color included in the designated color gamut CRdL.

The subsequent processing is the same as the processing in the first embodiment.

With the color value prediction system CPS3 in the third embodiment, it is possible to improve prediction accuracy of a color that the user considers important in the color value prediction model CPM1 of the color value prediction system CPS1 without using the existing color value prediction model CPM0 (see the upper right part of FIG. 1 and a lower right part of FIG. 4).

D. Fourth Embodiment

Figure 5:
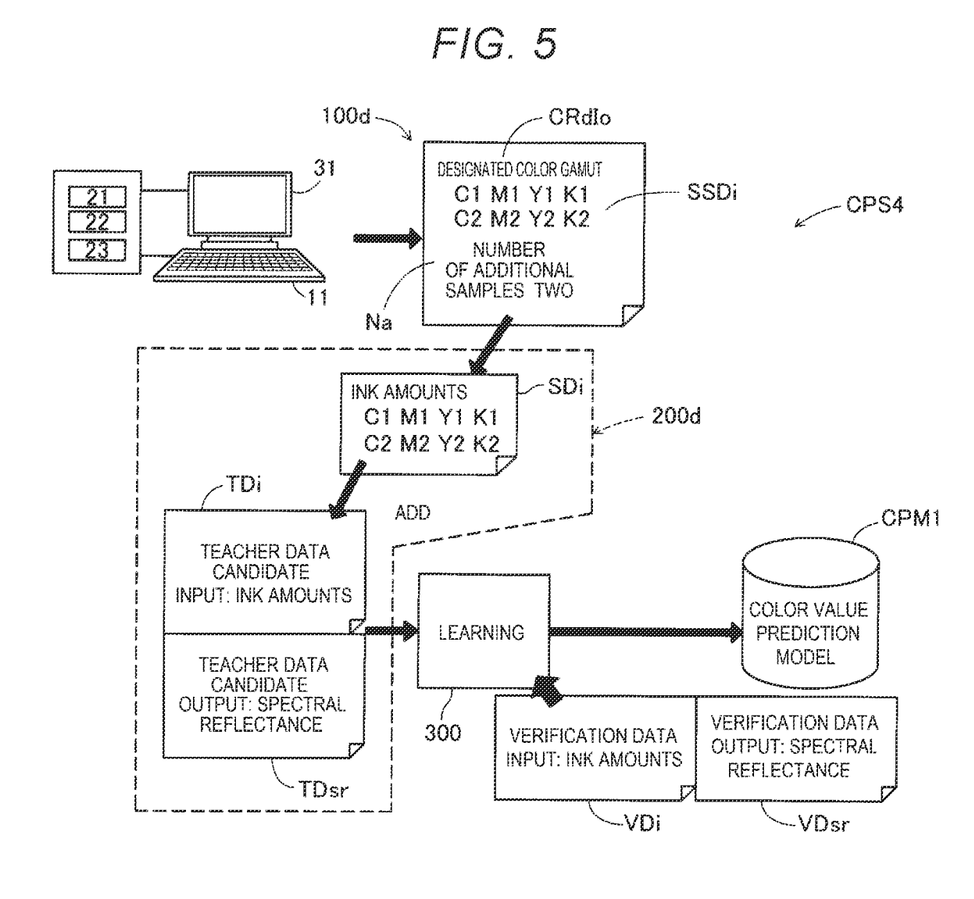
FIG. 5 is an explanatory diagram showing a color value prediction system in a fourth embodiment.

FIG. 5 is an explanatory diagram showing a color value prediction system CPS4 in a fourth embodiment. The color value prediction system CPS4 in the fourth embodiment does not include the color value prediction model CPM0 (see an upper right part of FIG. 5). In the color value prediction system CPS4 in the fourth embodiment, a manner of inputting a designated color gamut to a receiving section from a user and a method of calculating the combination SDi of ink amounts of the first apparatus are different from those in the color value prediction system CPS1 in the first embodiment (see an upper center part of FIG. 5 and the upper center part of FIG. 1). Otherwise, the color value prediction system CPS4 in the fourth embodiment is the same as the color value prediction system CPS1 in the first embodiment.

In the color value prediction system CPS4, a receiving section 100d receives, from the user, an input of the number Na of additional samples (see an upper left part of FIG. 5). The receiving section 100d receives, from the user, as an input of information representing a designated color gamut CRdIo, an input of specific information SSDi representing a combination of ink amounts of the first apparatus, to which the color value prediction model CPM1 is applied. The specific information SSDi is information concerning Na individual colors specified by the combination of ink amounts of the first apparatus. A designated color gamut specified by a combination of gradation values in the CMYK color space of the first apparatus, to which the color value prediction model CPM1 is applied, is represented as the designated color gamut CRdIo in this specification.

In an example shown in FIG. 5, the number Na of additional samples is two. The specific information SSDi is Na points specified by ink amounts about colors of cyan, magenta, yellow, and black, which are ink colors of the first apparatus. The specific information SSDi is represented by, for example, ink amounts [C, M, Y, K]=[C1, M1, Y1, K1], [C2, M2, Y2, K2] about the colors of cyan, magenta, yellow, and black, which are the ink colors of the first apparatus (see the upper center part of FIG. 5).

In step S220 in FIG. 2, a preparing section 200d determines the combination SDi of ink amounts of the first apparatus corresponding to the target color values TGC. The combination SDi of ink amounts is the specific information SSDi itself (see a center part of FIG. 5).

The subsequent processing is the same as the processing in the first embodiment.

According to the fourth embodiment, the user can accurately designate, actually using the ink amounts of the first apparatus, to which the color value prediction model CPM1 is applied, a designated color gamut including a color that the user considers important (see a lower right part and the upper center part of FIG. 5). When printing is performed by the first apparatus using special inks usable by the first apparatus, it is possible to generate a color value predictor that can accurately predict color values.

E. Other Embodiments

E1. First Another Embodiment (1) In the embodiments explained above, the first teacher information TDi representing the plurality of sets of combinations of ink amounts of the first apparatus used as the teacher data includes, together with the designated teacher information SDi, which is the information about the combinations of ink amounts of the first apparatus corresponding to the target color values TGC, the plurality of sets of combinations of ink amounts selected such that there is no deviation in a color space that can be reproduced by the first apparatus (see the lower left part of FIG. 1). However, the first teacher information TDi other than the designated teacher information SDi may be a combination of other ink amounts. For example, the first teacher information TDi other than the designated teacher information SDi can include, about a region having brightness equal to or lower than a fixed value in a color space, a combination of ink amounts at higher density than the other color spaces. The first teacher information TDi other than the designated teacher information SDi can also include, about one or more regions including a human skin color in the color space, a combination of ink amounts at higher density than the other color spaces.

(2) In the embodiments, it is assumed that the designated color gamut is one region continuous in the color space (see the upper left part of FIG. 1). However, the designated color gamut may be two or more regions apart from each other in the color space.

(3) In the first embodiment, in the optimization processing, the preparing section 200 selects a combination of ink amounts, a total amount of which is the smallest, out of the plurality of combinations of ink amounts approximate to one another (see the upper right part of FIG. 1). However, the selection of a combination of ink amounts may be performed according to other standards. The combination of ink amounts selected out of the plurality of combinations of ink amounts approximate to one another is not limited to one set. Two or more sets of combinations of ink amounts may be selected. For example, one or more combinations of ink amounts not including a specific ink may be selected. The preparing section 200 may cause the user to select one or more combinations of ink amounts out of the plurality of combinations of ink amounts approximate to one another.

(4) In the embodiments, about the plurality of combinations of ink amounts approximate to one another by a certain degree or more in the information SDin representing the plurality of sets of combinations of ink amounts, in the optimization processing, the preparing section 200 selects only one set of combinations of ink amounts out of the plurality of combinations of ink amounts. However, it is also possible to adopt a form in which, in the optimization processing, processing for removing one or more combinations of colors is not performed about the plurality of combinations of colors approximate to one another.

E2. Second Another Embodiment

In the embodiments, the designated color gamut is designated by the gradation values in the L*a*b* color space, the gradation values in the CMYK color space of the second apparatus, or the gradation values of the ink colors of the first apparatus (see the upper left part of FIG. 1 and upper left parts of FIGS. 3 to 5). However, the designated color gamut may be designated by gradation values in an xyz color space or gradation values in an RGB color space of the second apparatus.

E3. Third Another Embodiment (1) In the second embodiment, the ICC profile Prf is input to the color value prediction system CPS2 (see the upper left part of FIG. 3). However, the receiving section of the color value prediction system may receive, instead of the ICC profile itself of the second apparatus, information that can specify the ICC profile of the second apparatus. In such a form, the color value prediction system acquires, based on the information that can specify the ICC profile, the ICC profile, for example, from a server storing the ICC profile. That is, the receiving section may receive designation of the ICC profile of the second apparatus according to an input of the ICC profile itself of the second apparatus or according to an input of the information that can specify the ICC profile of the second apparatus.

(2) In the second embodiment, the ICC profile Prf stores the gradation values in the CMYK color space of a certain apparatus and the gradation values in the L*a*b* color space in association with each other (see the upper left part of FIG. 3). The apparatus to which the gradation values of CMYK stored by the ICC profile Prf correspond may be the same as or may be different from the apparatus, to which the color value prediction model CPM1 is applied.

(3) In the second embodiment, the receiving section 100b of the color value prediction system CPS2 receives an input of the designated color gamut CRdIi according to the combination of gradation values in the CMYK color space of a certain apparatus (see the upper left part of FIG. 1). However, as in the fourth embodiment, the color value prediction system may receive, as the input of the information representing the designated color gamut, an input of specific information, which is information concerning a plurality of individual colors, specified by a combination of ink amounts of a certain apparatus.

E4. Fourth Another Embodiments

In the embodiments, the color value prediction model CPM1 is the database storing, in association with one another, (a) the information Di representing the combination of ink amounts of the first apparatus, (b1) the information representing the combination of gradation values in the L*a*b* color space of the color reproduced in the combination of ink amounts by the first apparatus, and (b2) the spectral reflectance Dsr of the color reproduced in the combination of ink amounts by the first apparatus. The color value prediction model CPM0 is the database storing, in association with one another, (a) the information Di representing the combination of ink amounts of a certain apparatus, (b1) the information representing the combination of gradation values in the L*a*b* color space of the color reproduced in the combination of ink amounts by the apparatus, and (b2) the information representing the spectral reflectance Dsr of the color reproduced in the combination of ink amounts by the apparatus.

However, it is also possible to adopt a form in which the color value prediction model does not include the information representing the combination of gradation values in the L*a*b* color space. In such a form, it is preferable that the color value prediction system includes a gradation-value calculating section that can calculate a combination of gradation values in the L*a*b* color space based on the spectral reflectance Dsr.

E5. Fifth Another Embodiment

In the color value prediction system CPS4, the receiving section 100d receives, as the input of the information representing the designated color gamut CRdIo, the input of the specific information SSDi representing the combination of ink amounts of the first apparatus, to which the color value prediction model CPM1 is applied. However, it is also possible to adopt a form in which the color value prediction system receives an input of specific information representing a combination of ink amounts of an apparatus other than the first apparatus, to which the color value prediction model CPM1 is applied.

E6. Sixth Another Embodiment

In the embodiments, the generating section 300 performs the machine learning by adding, to the designated teacher information SDi of the combinations of the ink amounts of the first apparatus corresponding to the target color values TGC in the first teacher information TDi representing the plurality of sets of combinations of ink amounts of the first apparatus, the weight larger than the weight added to the information representing the combination of ink amounts (see the lower center part of FIG. 1).

However, the generating section 300 may perform the machine learning by adding, to a part of information other than the designated teacher information SDi in the first teacher information TDi, weigh larger than the weight added to the designated teacher information SDi. For example, the generating section 300 may perform the machine learning by adding, to information concerning a color included in a region including a human skin color in the first teacher information TDi, weight larger than the weight added to the designated teacher information SDi.

F. Still Other Aspects

The present disclosure is not limited to the embodiments explained above and can be realized in various aspects without departing from the gist of the present disclosure. For example, the present disclosure can also be realized by the following aspects. The technical features in the embodiments corresponding to technical features in the aspects described below can be substituted or combined as appropriate in order to solve a part or all of the problems of the present disclosure or in order to achieve a part or all of the effects of the present disclosure. Unless the technical feature are explained as essential technical features in this specification, the technical features can be deleted as appropriate.

(1) According to an aspect of the present disclosure, there is provided a color value prediction system that receives an input of information representing a combination of ink amounts and outputs spectral reflectance. The color value prediction system includes: a color-value predicting section configured to receive an input of information representing ink amounts of a first apparatus and output spectral reflectance; a receiving section configured to receive an input of information representing a designated color gamut; a preparing section configured to prepare first teacher information representing a plurality of sets of combinations of ink amounts of the first apparatus and second teacher information, which is a plurality of sets of spectral reflectance respectively associated with the plurality of sets of combinations of ink amounts of the first teacher information; and a generating section configured to generate the color-value predicting section with machine learning in which the first teacher information serving as an input value and the second teacher information serving as an output value are used as teacher data. The first teacher information includes designated teacher information representing a combination of ink amounts of the first apparatus representing a color included in the designated color gamut.

With such a form, by receiving, from a user, an input of the designated color gamut including a color that the user considers important, it is possible to improve, about the color that the user considers important, prediction accuracy by the color value prediction system.

(2) In the color value prediction system in the aspect, it is possible to adopt a form in which the receiving section receives the input of the information representing the designated color gamut by gradation values in an L*a*b* color space.

With such a form, the user can accurately designate, using gradation values not depending on apparatuses, the designated color gamut including the color that the user considers important.

(3) In the color value prediction system in the aspect, it is possible to adopt a form in which the receiving section receives designation of an ICC profile of a second apparatus and the input of the information representing the designated color gamut by gradation values in a CMYK color space of the second apparatus, and the preparing section adjusts the designated teacher information based on a combination of gradation values in an L*a*b* color space corresponding to a combination of the gradation values in the CMYK color space of the second apparatus representing the color included in the designated color gamut, the combination being a combination of gradation values in the L*a*b* color space obtained by using the ICC profile.

With such a form, the user can designate the designated color gamut including the color that the user considers important using the gradation values in the CMYK color space, the gradation values being gradation values in the CMYK color space of an apparatus that the user can easily acquire.

(4) In the color value prediction system in the aspect, it is possible to adopt a form in which the color value prediction system further includes another color-value predicting section storing the information representing the combination of the ink amounts and information representing a combination of the gradation values in the L*a*b* color space in association with each other, the preparing section adjusts the designated teacher information based on a combination of the gradation values in the L*a*b* color space corresponding to a combination of ink amounts of an apparatus, to which the other color-value predicting section is applied, representing the color included in the designated color gamut, the combination being a combination of gradation values in the L*a*b* color space obtained by using the other color-value predicting section.

With such a form, it is possible to easily prepare the designated teacher information representing the color in the designated color gamut.

(5) In the color value prediction system in the aspect, it is possible to adopt a form in which the receiving section receives, as the input of the information representing the designated color gamut, an input of specific information representing the combination of the ink amounts of the first apparatus, and the preparing section prepares the first teacher information including the specific information as the designated teacher information.

With such a form, the user can accurately designate, actually using the ink amounts of the first apparatus to which the color value prediction section is applied, the designated color gamut including the color that the user considers important.

(6) In the color value prediction system in the aspect, it is possible to adopt a form in which the generating section performs the machine learning by adding, to the designated teacher information, weight larger than weight added to another kind of the first teacher information.

With such a form, it is possible to further improve the prediction accuracy of the color that the user considers important.

(7) According to another aspect of the present disclosure, there is provided a generation method for a color value predictor storing information representing a combination of ink amounts and spectral reflectance in association with each other. The generation method for the color value predictor includes: receiving an input of information representing a designated color gamut; preparing first teacher information representing a plurality of sets of combinations of ink amounts of a first apparatus and second teacher information, which is a plurality of sets of spectral reflectance respectively associated with the plurality of sets of combinations of ink amounts of the first teacher information; and generating the color value predictor with machine learning in which the first teacher information serving as an input value and the second teacher information serving as an output value are used as teacher data. The first teacher information includes designated teacher information representing a combination of ink amounts of the first apparatus representing a color included in the designated color gamut.

With such a form, by receiving, from a user, an input of information representing a designated color gamut including a color that the user considers important, it is possible to generate the color value predictor having high precision accuracy of the color that the user considers important.

(8) In the generation method for the color value predictor in the aspect, it is possible to adopt a form in which the receiving the input of the information representing the designated color gamut includes receiving an input of information representing the designated color gamut by gradation values in an L*a*b* color space.

(9) In the generating method for the color value predictor in the aspect, it is possible to adopt a form in which the receiving the input of the information representing the designated color gamut includes receiving designation of an ICC profile of a second apparatus and the input of the information representing the designated color gamut by gradation values in a CMYK color space of the second apparatus, and the preparing the first teacher information and the second teacher information includes: acquiring, using the ICC profile, a combination of gradation values in an L*a*b* color space corresponding to a combination of the gradation values in the CMYK color space of the second apparatus representing the color included in the designated color gamut; and adjusting the designated teacher information based on the acquired combination of the gradation values in the L*a*b* color space.

(10) In the generation method for the color value predictor in the aspect, it is possible to adopt a form in which the preparing the first teacher information and the second teacher information includes: acquiring, using another color-value predicting section storing the information representing the combination of the ink amounts and information representing a combination of the gradation values in the L*a*b* color space in association with each other, acquiring a combination of the gradation values in the L*a*b* color space corresponding to a combination of ink amounts of an apparatus, to which the other color-value predicting section us applied, representing the color included in the designated color gamut; and adjusting the designated teacher information based on the acquired combination of the gradation values in the L*a*b* color space.

(11) In the generation method for the color value predictor in the aspect, it is possible to adopt a form in which the receiving the input of the information representing the designated color gamut includes receiving, as the input of the information representing the designated color gamut, an input of specific information representing the combination of the ink amounts of the first apparatus, and the preparing the first teacher information and the second teacher information includes preparing the first teacher information including the specific information as the designated teacher information.

(12) In the generation method for the color value predictor in the aspect, it is possible to adopt a form in which the generating the color value predictor with the machine learning includes performing the machine learning by adding, to the designated teacher information, weight larger than weight added to another kind of the first teacher information.

With such a form, it is possible to configure the color value predictor having higher prediction accuracy of the color that the user considers important.

The present disclosure can also be realized in various forms other than the generation method for the color value predictor and the color value prediction system. The present disclosure can be realized in forms of, for example, an adjusting method for the color value predictor, a computer program for realizing the generation method and the adjustment method for the color value predictor, and a non-transitory recording medium recording the computer program.

What is claimed is:

1. A color value prediction system that receives an input of information representing a combination of ink amounts and outputs spectral reflectance, the color value prediction system comprising:
   a color-value predicting section configured to receive an input of information representing ink amounts of a first apparatus and output spectral reflectance;
   a receiving section configured to receive an input of information representing a designated color gamut;
   a preparing section configured to prepare first teacher information representing a plurality of sets of combinations of ink amounts of the first apparatus and second teacher information, which is a plurality of sets of spectral reflectance respectively associated with the plurality of sets of combinations of ink amounts of the first teacher information; and
   a generating section configured to generate the color-value predicting section with machine learning in which the first teacher information serving as an input value and the second teacher information serving as an output value are used as teacher data, wherein
   the first teacher information includes designated teacher information representing a combination of ink amounts of the first apparatus representing a color included in the designated color gamut.

2. The color value prediction system according to claim 1, wherein the receiving section receives the input of the information representing the designated color gamut by gradation values in an L*a*b* color space.

3. The color value prediction system according to claim 1, wherein
   the receiving section receives designation of an ICC profile of a second apparatus and the input of the information representing the designated color gamut by gradation values in a CMYK color space of the second apparatus, and
   the preparing section adjusts the designated teacher information based on a combination of gradation values in an L*a*b* color space corresponding to a combination of the gradation values in the CMYK color space of the second apparatus representing the color included in the designated color gamut, the combination being a combination of gradation values in the L*a*b* color space obtained by using the ICC profile.

4. The color value prediction system according to claim 2, further comprising another color-value predicting section storing the information representing the combination of the ink amounts and information representing a combination of the gradation values in the L*a*b* color space in association with each other, wherein
   the preparing section adjusts the designated teacher information based on a combination of the gradation values in the L*a*b* color space corresponding to a combination of ink amounts of an apparatus, to which the other color-value predicting section is applied, representing the color included in the designated color gamut, the combination being a combination of gradation values in the L*a*b* color space obtained by using the other color-value predicting section.

5. The color value prediction system according to claim 1, wherein
   the receiving section receives, as the input of the information representing the designated color gamut, an input of specific information representing the combination of the ink amounts of the first apparatus, and
   the preparing section prepares the first teacher information including the specific information as the designated teacher information.

6. The color value prediction system according to claim 1, wherein the generating section performs the machine learning by adding, to the designated teacher information, weight larger than weight added to another kind of the first teacher information.

7. A generation method for a color value predictor storing information representing a combination of ink amounts and spectral reflectance in association with each other, the generation method for the color value predictor comprising:
   receiving an input of information representing a designated color gamut;
   preparing first teacher information representing a plurality of sets of combinations of ink amounts of a first apparatus and second teacher information, which is a plurality of sets of spectral reflectance respectively associated with the plurality of sets of combinations of ink amounts of the first teacher information; and
   generating the color value predictor with machine learning in which the first teacher information serving as an input value and the second teacher information serving as an output value are used as teacher data, wherein
   the first teacher information includes designated teacher information representing a combination of ink amounts of the first apparatus representing a color included in the designated color gamut.

8. The generation method for the color value predictor according to claim 7, wherein
   the receiving the input of the information representing the designated color gamut includes receiving an input of information representing the designated color gamut by gradation values in an L*a*b* color space.

9. The generation method for the color value predictor according to claim 7, wherein
   the receiving the input of the information representing the designated color gamut includes receiving designation of an ICC profile of a second apparatus and the input of the information representing the designated color gamut by gradation values in a CMYK color space of the second apparatus, and
   the preparing the first teacher information and the second teacher information includes:
   acquiring, using the ICC profile, a combination of gradation values in an L*a*b* color space corresponding to a combination of the gradation values in the CMYK color space of the second apparatus representing the color included in the designated color gamut; and
   adjusting the designated teacher information based on the acquired combination of the gradation values in the L*a*b* color space.

10. The generation method for the color value predictor according to claim 8, wherein
    the preparing the first teacher information and the second teacher information includes:
    acquiring, using another color-value predicting section storing the information representing the combination of the ink amounts and information representing a combination of the gradation values in the L*a*b* color space in association with each other, acquiring a combination of the gradation values in the L*a*b* color space corresponding to a combination of ink amounts of an apparatus, to which the other color-value predicting section is applied, representing the color included in the designated color gamut; and adjusting the designated teacher information based on the acquired combination of the gradation values in the L*a*b* color space.

11. The generation method for the color value predictor according to claim 7, wherein the receiving the input of the information representing the designated color gamut includes receiving, as the input of the information representing the designated color gamut, an input of specific information representing the combination of the ink amounts of the first apparatus, and the preparing the first teacher information and the second teacher information includes preparing the first teacher information including the specific information as the designated teacher information.

12. The generation method for the color value predictor according to claim 7, wherein the generating the color value predictor with the machine learning includes performing the machine learning by adding, to the designated teacher information, weight larger than weight added to another kind of the first teacher information.

* * * * *